US006993652B2

(12) United States Patent
Medvinsky

(10) Patent No.: US 6,993,652 B2
(45) Date of Patent: Jan. 31, 2006

(54) METHOD AND SYSTEM FOR PROVIDING CLIENT PRIVACY WHEN REQUESTING CONTENT FROM A PUBLIC SERVER

(75) Inventor: Alexander Medvinsky, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 664 days.

(21) Appl. No.: 09/972,523

(22) Filed: Oct. 5, 2001

(65) Prior Publication Data

US 2003/0070068 A1 Apr. 10, 2003

(51) Int. Cl.
*H04L 9/32* (2006.01)

(52) U.S. Cl. ....................... 713/155; 713/156; 713/171; 713/201; 380/279; 705/69

(58) Field of Classification Search ................. 713/155, 713/156, 159, 161, 168, 170, 171, 172, 173, 713/175, 176, 181, 182, 185, 200, 201; 380/229, 380/232, 249, 258, 279; 705/65, 66, 67; 709/225, 709/226, 229
See application file for complete search history.

(56) References Cited

U.S. PATENT DOCUMENTS 5,602,918 A 2/1997 Chen et al. ................... 380/21
5,784,463 A 7/1998 Chen et al. ................... 380/21
6,075,860 A 6/2000 Ketcham ..................... 380/25

OTHER PUBLICATIONS

*PCT International Search Report*, United States International Search Authority (US/ISA), from corresponding PCT Application No. PCT/US02/30267 mailed Mar. 21, 2003, four pages.

J. Kohl and C. Neuman; The Kerberos Network Authentication Service (V5); Sep. 1993; 61 pages (pp. 1–11, 16–35, and 38–67); http://www.ietf.ort/rfc/rfc 1510.txt.

*Primary Examiner*—Justin T. Darrow
(74) *Attorney, Agent, or Firm*—Robert P. Marley

(57) ABSTRACT

Method and system for providing client privacy on the Internet when the client requests content from a public application server. The method is well-suited to key management protocols that utilize the concept of tickets. The client name or identity is encrypted in all key management messages where the client is requesting a ticket for a specific application server. The key management messages are between the client and a key distribution center (KDC) and between the client and the specific application server. The KDC does not provide the client name or identity in the clear in such messages. This prevents the client's identity from being linked with the content provided by the specific application server, which results in improved user privacy.

16 Claims, 2 Drawing Sheets

200

100

METHOD AND SYSTEM FOR PROVIDING CLIENT PRIVACY WHEN REQUESTING CONTENT FROM A PUBLIC SERVER

BACKGROUND OF THE INVENTION

1. Field of the Invention

The present invention relates generally to network security, and more specifically to a method and system for providing client privacy when requesting content from an application server.

2. Discussion of the Related Art

The Internet is an insecure network. Many of the protocols used on the Internet do not provide any security. Data that is transmitted over the Internet without using encryption or any other type of security scheme is said to be transmitted "in the clear". Tools are readily available that allow hackers to "sniff" data, such as passwords, credit card numbers, client identity and names, etc., that is transmitted over the Internet in the clear. Thus, applications that send unencrypted data over the Internet are extremely vulnerable.

Kerberos is an example of a known network authentication protocol that is designed to provide authentication for client/server applications by using secret-key cryptography. The Kerberos protocol, which is available from the Massachusetts Institute of Technology, uses cryptography so that a client can purportedly prove its identity to a server (and vice versa) across an insecure network connection. After a client and server have used Kerberos to prove their identity, they can also encrypt all of their communications to purportedly assure privacy and data integrity as they conduct their business.

It is with respect to these and other background information factors relevant to the field of network security that the present invention has evolved.

SUMMARY OF THE INVENTION

The present invention provides a method of providing client privacy when requesting content from an application server. The method includes the steps of: receiving a request for a ticket granting ticket (TGT ticket) from a client; generating the TGT ticket with an identity of the client encrypted therein; sending the TGT ticket to the client; receiving a request for a service ticket (ST ticket) for the application server from the client that includes the TGT ticket and that does not provide the identity of the client in the clear; generating the ST ticket with the identity of the client encrypted therein; and sending the ST ticket to the client without providing the identity of the client in the clear.

In another embodiment, the invention can be characterized as a system for providing client privacy when requesting content from an application server. The system includes an authentication server configured to receive a request for a TGT ticket from a client, generate the TGT ticket with an identity of the client encrypted therein, and send the TGT ticket to the client. A ticket granting server is configured to receive a request for an ST ticket for the application server from the client that includes the TGT ticket and that does not provide the identity of the client in the clear, generate the ST ticket with the identity of the client encrypted therein, and send the ST ticket to the client without providing the identity of the client in the clear.

A better understanding of the features and advantages of the present invention will be obtained by reference to the following detailed description of the invention and accompanying drawings which set forth an illustrative embodiment in which the principles of the invention are utilized.

DETAILED DESCRIPTION OF THE INVENTION

Kerberos suffers from the disadvantage that a key distribution center (KDC) reply to a ticket request from a client for a particular application server includes the client name in the clear. Because Kerberos specifies that in such replies the particular application server's identity is also provided in the clear, the client's identity can be easily linked to the content. This means that the client's (i.e. the user's) privacy is severely compromised because somebody can easily identify the particular servers from which the client is requesting content. Network users requesting content from a public server may not desire to be associated with the content they request. The present invention provides a method and system that overcomes these and other disadvantages and provides improved user privacy when requesting content from a server, such as a public server.

The present invention is well-suited to key management protocols that utilize the concept of tickets, which are authentication tokens encrypted with a symmetric key that allow a client to authenticate to a specific server. In accordance with an embodiment of the present invention, the client name or identity is encrypted in all key management messages where the client is either requesting a ticket for a specific application server (e.g. content provider) or is talking directly to the content provider. The user (client) name is encrypted in all key management messages that are either directly addressed to an application server or that contain the server name in the clear. These key management messages are between the client and the KDC and between the client and an application server. The present invention overcomes the disadvantages of standard Kerberos, where standard Kerberos tickets carry the client name in encrypted form but KDC replies to ticket requests for a particular server include the client name in the clear.

Figure 1:
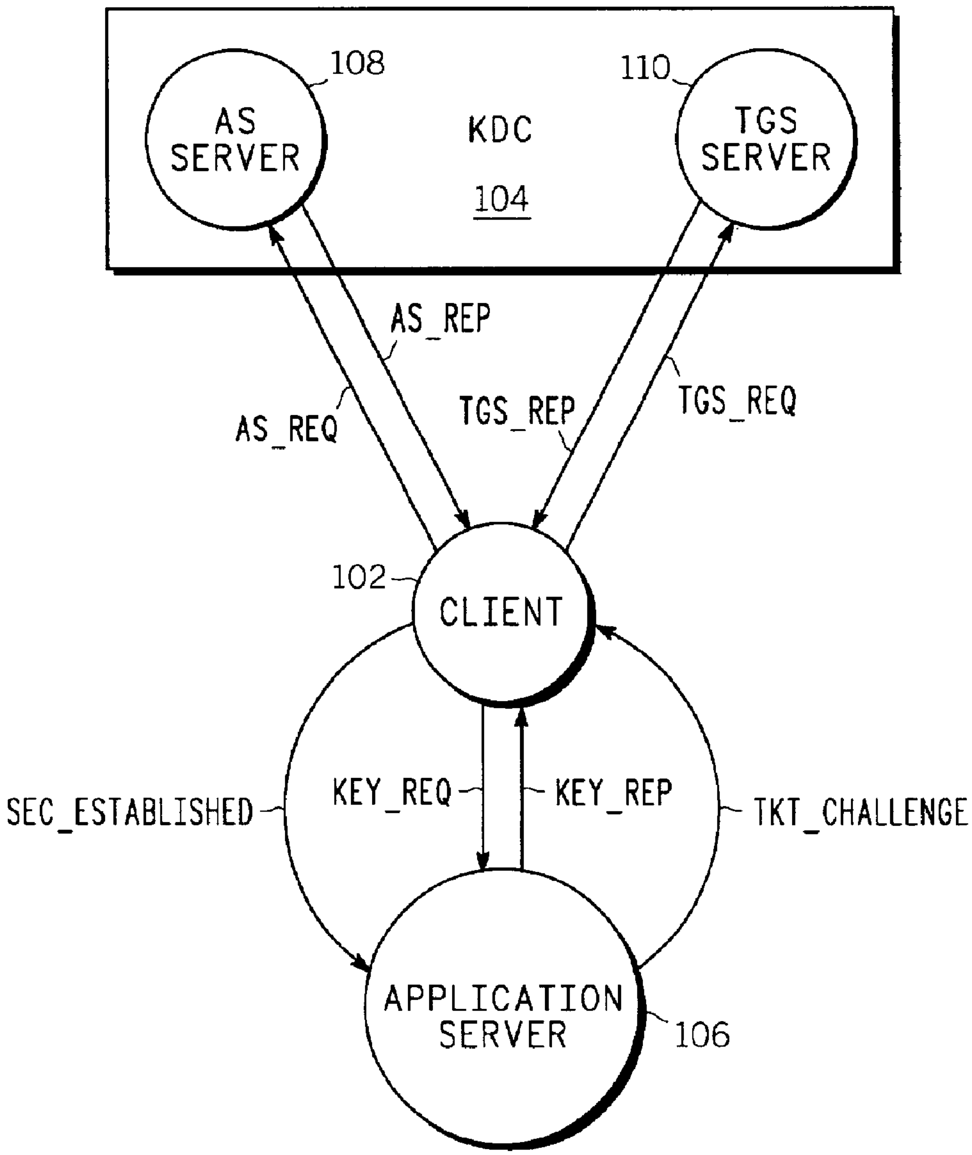
FIG. 1 is a block diagram illustrating a system made in accordance with an embodiment of the present invention.

Referring to FIG. 1, there is illustrated a model of a system 100 made in accordance with an embodiment of the present invention. The system 100, which comprises an example of one possible implementation of the present invention, uses an authentication key management protocol that provides security and privacy on a network, such as the Internet, and that can scale to millions of users. In general, the system 100 involves a client 102 interacting with a centralized Key Distribution Center (KDC) 104 using both public key and symmetric key algorithms, as well as with individual application servers, such as the application server 106, using only symmetric key algorithms. The protocol is generic and can easily be adapted to different applications that require authentication in a distributed environment. Furthermore, it can be interfaced with a centrally administered user database.

The client 102 may comprise a process or device that makes use of a network service on behalf of a user. By way of example, the client 102 may comprise any type of computer, or the client 102 may comprise a "thin client" such as a wireless telephone or home appliance having a low-end microprocessor. Note that in some cases a server may itself be a client of some other server (e.g. a print server may be a client of a file server). The application server 106 provides a resource to network clients. In the illustrated embodiment, the KDC 104 includes an authentication server (AS server) 108 and a ticket granting server (TGS server) 110. The AS server 108 issues a ticket granting ticket (TGT ticket) to the client 102 after verifying its credentials. The TGS server 110 provides an application server service ticket (ST ticket) to the client 102. The ST ticket is an end service ticket that the client 102 presents to the application server 106 when the client 102 requests a service. The application server 106 provides various services to the client 102, when the client 102 authenticates itself using the ST tickets.

The basic message types used by the system 100 are as follows:

(A) Authentication Server Request message (AS_REQ): Message from the client 102 to request TGT ticket from the AS server 108;

(B) Authentication Server Reply message (AS_REP): Reply message to the client 102 from the AS Server 108 with the TGT ticket;

(C) Ticket Granting Server Request message (TGS_REQ): Message from the client 102 to request an ST ticket from the TGS server 110;

(D) Ticket Granting Server Reply message (TGS_REP): Reply message from the TGS Server 110 to the client 102 with the ST ticket;

(E) Ticket Challenge message (TKT_CHALLENGE): Message that is sent to the client 102 from the application server 106 to initiate key management;

(F) Key Request message (KEY_REQ): Message sent from the client 102 to the application server 106 to request security (key management) parameters;

(G) Key Reply message (KEY_REP): Reply message from the application server 106 to the client 102 with sub key and application specific data; and (H) Security Established message (SEC_ESTABLISHED): Message from the client 102 to the application server 106 stating that security is established.

Each of the messages will typically include a header followed by the body of the message, with the header being common to all the messages. By way of example, the header may include a message type field, a protocol version number field, and checksum. The message type field indicates the message type, such as AS_REQ, AS_REP, etc. Immediately following the message header is the body of the message having the list of attributes preferably in type-length-value format.

The client 102 generates an AS_REQ message to initiate the authentication service exchange between the client 102 and the AS server 108 (part of the KDC 104) when it wishes to obtain a TGT ticket, which is a ticket for the TGS server 110, also part of the KDC 104. In other words, the AS_REQ message is sent by the client 102 to the AS server 108 to obtain the TGT ticket which is used by the client to request ST tickets for specific application servers, such as the application server 106. By way of example, the AS_REQ message may include the client's identity (e.g. name), the TGS server 110's identity, and a nonce to tie it to a response. It may also include a list of symmetric encryption algorithms that are supported by the client 102. To check against replays, this message may also include a timestamp, as well as a signature for message integrity. The signature may be a keyed checksum or a digital signature.

The public key to verify a signature is preferably kept in the user database. Digital certificates can be optionally included in the AS_REQ message and may be utilized instead of the stored public keys to verify digital signatures. The client 102's permanent symmetric key for verifying a keyed checksum is preferably kept in the same user database. The AS_REQ message may also include public key information that is necessary for key agreement (e.g. Elliptic Curve Diffie-Heilman parameters). By way of example, Elliptic Curve may be used for public key encryption because of its processing speed. It is one or two orders of magnitude faster than RSA. The Rijndael encryption standard may be used with the 128-bit key length.

The AS server 108 processes the AS_REQ message in order to verify it. If the AS_REQ processing does not generate any error, the AS server 108 generates an AS_REP message in response to the AS_REQ message. Specifically, the AS server 108 looks up the TGS server 110's and client 102's keys in the database and generates a random session key, for subsequent authentication with the KDC 104. The AS server 108 generates a TGT ticket, which has both a clear and an encrypted part. The TGS server 110's identity and the ticket validity period may be provided in the clear inside the issued TGT ticket. The encrypted part of the ticket contains the client 102's name, session key and any other data to be kept private. The ticket preferably also provides a list of encryption types and checksum types supported by the KDC 104. The encrypted part of the ticket may be encrypted using the KDC 104's secret key.

The AS_REP message should preferably be signed by the KDC 104 using an algorithm that is identical to the one used by the client 102 to generate a signature for the AS_REQ message. This signature can be either a digital signature or a keyed checksum using the client 102's secret key. The public key information is the KDC 104's public part of the key agreement parameters and should indicate the same key agreement algorithm as the one selected by the client 102. Finally, the AS_REP message preferably contains the nonce that was copied from the AS_REQ message, to prevent replays.

The encrypted part of the AS_REP message preferably contains the same information as is in the TGT ticket so that the client 102 has read-only access to its own authorization-data, but this is not a requirement of the present invention. This optional feature provides a convenience to the user because if the client 102 knows it own authorization data, it is not going to attempt actions that are later going to be rejected by an application server anyway, since an application server will trust only the copy of the client information that is encrypted inside the ticket. Also, for clients with hardware security that prevents a user from hacking and changing its own authorization data, this optional feature could be a security advantage because readable authorization data might also authorize the client for some local actions, such as for example the right to save and replay movies on local disk. The encrypted part of the AS_REP message preferably also contains the client 102's identity to verify that this reply was originally constructed by the KDC 104 for this particular client 102. The data is preferably encrypted with a symmetric key derived from the key agreement algorithm.

The client 102 processes the AS_REP message to verify its authenticity and to decrypt the private ticket part in the message to obtain the TGT ticket. If the authenticity of the AS_REP message cannot be verified, the client 102 preferably does not send an error message back to the AS server 108. In some cases, the client may retry with another AS_REQ message.

The present invention optionally allows the passing of digital certificates in both the AS_REQ and AS_REP messages, to allow the client 102 and the KDC 104 to authenticate each other with digital certificates. Without certificates, it is expected that the client 102 is already provisioned with the KDC public key and that the KDC 104 already has the client 102's public key in its database. A digital signature on an AS_REQ is verified by the KDC 104 with a client public key that it looks up in its database. The client 102 verifies a digital signature on an AS_REP with a pre-provisioned KDC public key.

After the client 102 has obtained a TGT ticket via the AS server 108 exchange, the client 102 initiates the TGS_REQ message exchange between the client 102 and the TGS server 110 when the client 102 wishes to obtain authentication credentials for a given or particular application server, such as the application server 106. The TGS_REQ message is generated and sent by the client 102 to the TGS server 110 to obtain an application server service ticket (ST ticket) (that can be used in a KEY_REQ message). The client 102 presents the TGT ticket obtained from the AS_REP message as part of the TGS_REQ message. The TGS_REQ message specifies the application server 106's identity as well as the client 102's identity (which is inside the TGT ticket). The client 102's identity is protected because it is in the encrypted part of the TGT ticket and is not included in the clear part of the message. The session key from the TGT ticket may be used for the encryption and decryption in the TGS_REQ exchange. Thus, a snooper is unable to detect which services the client (i.e. user) is requesting.

After the client 102 sends out the TGS_REQ message it preferably saves the nonce value in order to later validate the matching TGS_REP message from the KDC 104. The client 102 preferably keeps the nonce value until a configurable time out value expires. After the time out, the client 102 will no longer be able to process the corresponding TGS_REP and must retry.

The TGS server 110 verifies the TGS_REQ message and processes the TGT ticket. The TGS server 110 then generates the TGS_REP message in response to the TGS_REQ message. The TGS_REP message includes the ST ticket (which is the end service ticket) issued by the KDC 104, which the client 102 presents to the application server 106 when it needs to request a service. The application server 106's identity and the ticket validity period may be provided in the clear inside the issued ST ticket. The encrypted part of the ST ticket contains the client 102's name and a session key encrypted with a key shared by the application server 106 and the KDC 104. Any additional client data that needs to be private could be included as part of the encrypted part of the ST ticket. The TGS_REP message is signed by the KDC 104 with a keyed checksum using the TGT ticket session key. Finally, the TGS_REP message contains the nonce that was copied from the TGS_REQ message, to prevent replays.

By way of example, the TGS server 110 may generate the TGS_REP message using the following procedure. First, the nonce from the TGS_REQ message is included in the TGS_REP message to tie it to the request. Next, the KDC 104 assigns the type of the random (service ticket) session key. If more than one encryption algorithm is available, the KDC 104 preferably selects the strongest one. The KDC 104 then generates the ST ticket. The application server 106's secret key is used to encrypt the encrypted ticket part and also generate a keyed checksum over the whole ST ticket. The end time of the ST ticket is preferably determined by the KDC 104. The client 102 may specify a shorter lifetime, if it wishes. The encrypted part of the ST ticket contains the client 102's identity, session key and other private data. The TGT ticket session key is used to generate the encrypted data portion of the TGS_REP message, and a keyed checksum (using the TGT session key) is added over the TGS_REP message. Again, this is just one example of a procedure that the TGS server 110 may use to generate the TGS_REP message.

Because the client 102's name is contained in the encrypted part of the ST ticket in the TGS_REP message and is not sent in the clear, the client's identity is hidden and cannot be linked with the content that the client 102 will request from the application server 106. This way a snooper cannot determine with which application server the client 102 wishes to communicate. The present invention differs from Kerberos where a KDC reply to a ticket request from a client for a particular application server includes the client name in the clear in addition to the client name being encrypted in the ticket. In fact, with the present invention the only message in which the client 102's name is provided in the clear is the AS_REQ message, which is not a problem because no security has been established yet and the client 102 has not asked for or identified a specific application server yet.

By way of example, the client 102 may use the following procedure to process the TGS_REP message. First, the client 102 parses the TGS_REP message header. If the header parsing fails, then the client 102 will act as if the TGS_REP was never received. The client 102 preferably does not send an error message back to the TGS server 110. In some cases, the client 102 will retry with another TGS_REQ message. If there are any outstanding TGS_REQ messages, the client 102 may continue waiting for a reply until a time out and then retry. Next, the client 102 verifies the protocol version number in the header. If this protocol version is not supported, the client 102 will act as if the TGS_REP message was never received. The client 102 then parses the rest of the message. If the message format is found to be illegal, the client 102 will act as if the TGS_REP message was never received.

Next, the client 102 looks for an outstanding TGS REQ message with the same nonce. If there is no match, the client proceeds as if the message was never received. If there is a match, then the client 102 verifies the checksum (using the TGT ticket session key). If the checksum does not verify, this message is dropped and the client 102 proceeds as if the message was never received.

The client then decrypts the private ticket part in the TGS_REP message, using the TGT ticket session key. If the private ticket part cannot be decrypted because the TGT ticket session key type and the type of the encrypted data do not match, a fatal error is reported to the user and the client 102 does not retry. If the resulting clear text contains formatting errors, contains a session key with the type that is not supported by this client 102, or contains a client identity that does not match the request, a fatal error is also reported to the user and the client 102 does not retry.

The client 102 then processes the ST ticket. If there is an error in the ST ticket, it is reported to the user as a fatal error and the client 102 does not retry with another TGS_REQ message. If no errors in the TGS_REP message are detected, the client 102 saves the full ST ticket and the clear text private ticket part in a new entry in its ticket cache.

The application server 106 utilizes the TKT_CHALLENGE message whenever it wants to initiate key management. To prevent denial of service attacks, this message includes a server-nonce field, which is a random value generated by the application server 106. The client 102 preferably should include the exact value of this server-nonce in the subsequent KEY_REQ message. This TKT_CHALLENGE message also preferably includes the application server 106's realm and principal name, which is used by the client 102 to find or to obtain a correct ticket for that application server.

The KEY_REQ and KEY_REP messages are used for key management and authentication between the client 102 and the application server 106. The KEY_REQ message is sent by the client 102 to the application server 106 in order to establish a new set of security parameters. Preferably, any time the client 102 receives a TKT_CHALLENGE message, it responds with a KEY_REQ message. The KEY_REQ message can also be used by the client 102 to periodically establish new keys with the application server 106. The client 102 starts out with a valid ST ticket, previously obtained in a TGS_REP message. The application server 106 starts out with its service key that it can use to decrypt and validate tickets. The KEY_REQ message includes the ST ticket and keyed checksum needed to authenticate the client 102. The KEY_REQ message preferably also contains a nonce (to tie it to the response KEY_REP message) and the client timestamp (to prevent replay attacks).

When the client 102 generates the KEY_REQ message, the client 102's identity is in the encrypted part of the ST ticket so it is not included in the clear part of the message. After the client 102 sends out the KEY_REQ message, it saves the client nonce value in order to later validate the matching KEY_REP message from the application server 106. The client 102 keeps the client nonce value until a configurable time out value expires. After the time out, the client 102 will no longer be able to process the corresponding KEY_REP message. If the KEY_REQ message was sent unsolicited by the client 102, the client 102 may retry after this time out.

The KEY_REP message is sent by the application server 106 in response to the KEY_REQ message. By way of example, the KEY_REP message may include a randomly generated subkey, encrypted with the session key shared between the client 102 and the application server 106. The KEY_REP message may also include additional information that is needed to establish security parameters.

Finally, a SEC_ESTABLISHED message is sent by the client 102 to the application server 106 to acknowledge that it received a KEY_REP message and successfully set up new security parameters.

Figure 2:
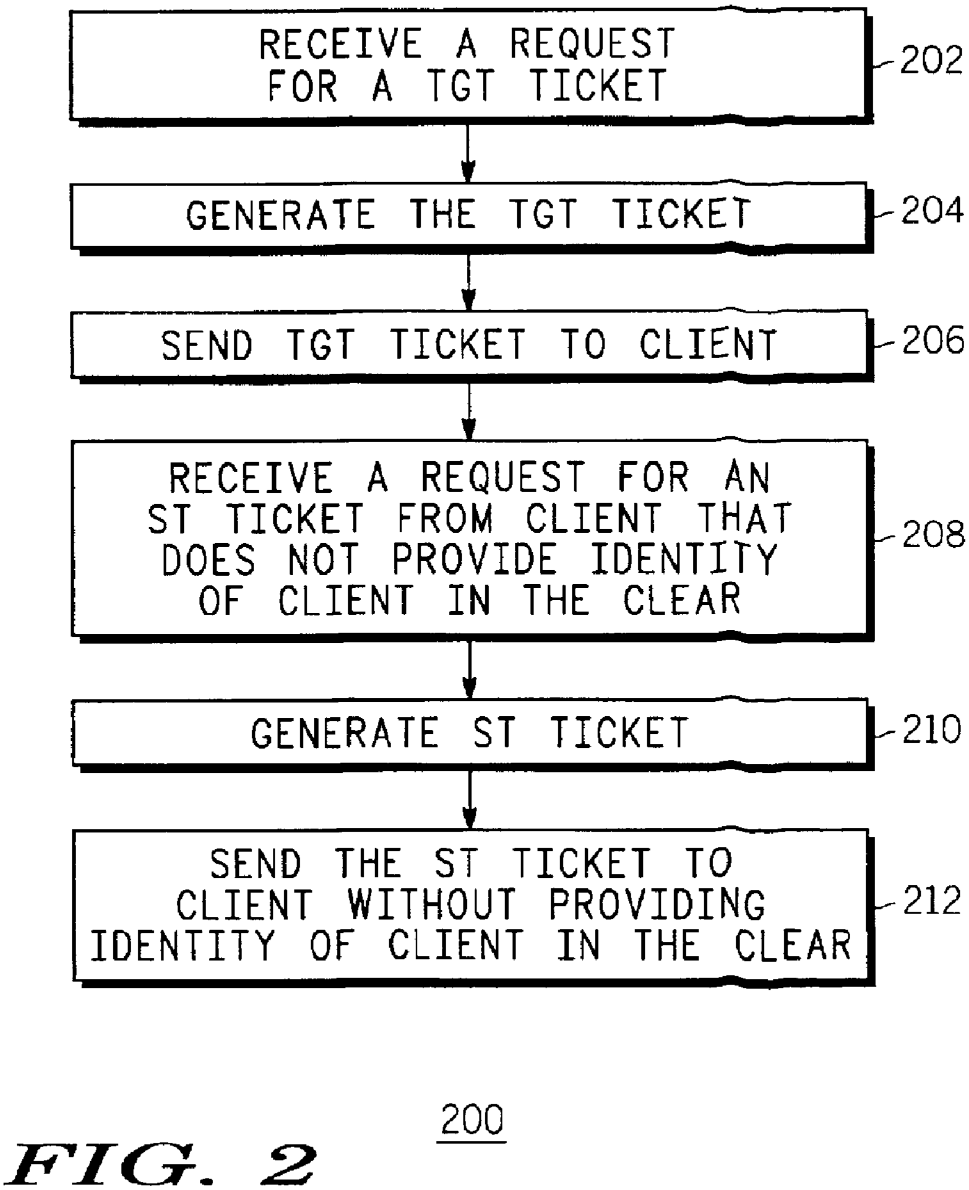
FIG. 2 is a flow chart illustrating a method of providing client privacy when requesting content from an application server in accordance with an embodiment of the present invention.

Referring to FIG. 2, there is illustrated a method 200 of providing client privacy when requesting content from an application server. By way of example, the method 200 may be implemented by the KDC 104 and the appropriate message types described above. In step 202 a request for a TGT ticket is received from a client, such as the client 102. In step 204 the TGT ticket is generated with an identity of the client encrypted therein. Step 204 may be performed, for example, by the AS server 108. In step 206 the TGT ticket is sent to the client. This step may also be performed by the AS server 108. In step 208 a request for an ST ticket for a particular application server is received from the client. The request for the ST ticket includes the TGT ticket and does not provide the identity of the client in the clear. In step 210 the ST ticket is generated with the identity of the client encrypted therein, which by way of example, may be performed by the TGS server 110. In step 212 the ST ticket is sent to the client without providing the identity of the client in the clear, which may also be performed by the TGS server 110.

Thus, the present invention provides a method and system that provides improved user privacy when requesting content from a server, such as a public server. Privacy is improved because the client name or identity is encrypted in all key management messages where the client is requesting a ticket for a specific application server (e.g. a content provider), which overcomes the disadvantages of standard Kerberos.

While the invention herein disclosed has been described by means of specific embodiments and applications thereof, numerous modifications and variations could be made thereto by those skilled in the art without departing from the scope of the invention set forth in the claims.

What is claimed is:

1. A method of providing client privacy when requesting content from an application server, comprising the steps of:

receiving a request for a ticket granting ticket (TGT ticket) from a client;

generating the TGT ticket with an identity of the client encrypted therein;

sending the TGT ticket to the client;

receiving a request for a service ticket (ST ticket) for the application server from the client that includes the TGT ticket and that does not provide the identity of the client in the clear;

generating the ST ticket with the identity of the client encrypted therein; and sending the ST ticket to the client without providing the identity of the client in the clear.

2. A method in accordance with claim 1, wherein the step of receiving a request for a TGT ticket comprises the step of receiving a request for a TGT ticket with an authentication server.

3. A method in accordance with claim 1, wherein the step of generating the TGT ticket comprises the step of generating the TGT ticket with an authentication server.

4. A method in accordance with claim 1, wherein the step of sending the TGT ticket to the client comprises the step of sending the TGT ticket to the client as part of an authentication server reply message.

5. A method in accordance with claim 1, wherein the step of receiving a request for an ST ticket for the application server comprises the step of receiving a request for an ST ticket for the application server with a ticket granting server.

6. A method in accordance with claim 1, wherein the request for an ST ticket for the application server specifies the application server's identity.

7. A method in accordance with claim 1, wherein the step of generating the ST ticket comprises the step of generating the ST ticket with a ticket granting server.

8. A method in accordance with claim 1, wherein the step of sending the ST ticket to the client comprises the step of sending the ST ticket to the client as part of a ticket granting server reply message.

9. A method in accordance with claim 1, wherein the step of sending the TGT ticket to the client comprises the step of sending the TGT ticket to the client without providing the identity of the client in the clear.

10. A method in accordance with claim 1, wherein the step of sending the TGT ticket to the client comprises the step of sending the TGT ticket to the client along with a copy of the client's own authorization data in read-only form.

11. A system for providing client privacy when requesting content from an application server, comprising:

an authentication server configured to receive a request for a ticket granting ticket (TGT ticket) from a client, generate the TGT ticket with an identity of the client encrypted therein, and send the TGT ticket to the client; and a ticket granting server configured to receive a request for a service ticket (ST ticket) for the application server from the client that includes the TGT ticket and that does not provide the identity of the client in the clear, generate the ST ticket with the identity of the client encrypted therein, and send the ST ticket to the client without providing the identity of the client in the clear.

12. A System in accordance with claim 11, wherein the authentication server and the ticket granting server form at least part of a key distribution center (KDC).

13. A system in accordance with claim 11, wherein the authentication server is further configured to send the TGT ticket to the client as part of an authentication server reply message.

14. A system in accordance with claim 11, wherein the authentication server is further configured to send the TGT ticket to the client without providing the identity of the client in the clear.

15. A system in accordance with claim 11, wherein the ticket granting server is further configured to send the ST ticket to the client as part of a ticket granting server reply message.

16. A method in accordance with claim 1, wherein the request for a ticket granting ticket is sent by the client to an authentication server, and the service ticket is sent from a ticket granting server to the client.

* * * * *